(12) United States Patent
Yi

(10) Patent No.: US 9,748,745 B2
(45) Date of Patent: Aug. 29, 2017

(54) CABLE PULLING ROLLER GUIDE

(71) Applicant: Young Kwan Yi, Silver Spring, MD (US)

(72) Inventor: Young Kwan Yi, Silver Spring, MD (US)

( * ) Notice: Subject to any disclaimer, the term of this patent is extended or adjusted under 35 U.S.C. 154(b) by 0 days.

(21) Appl. No.: 14/491,184

(22) Filed: Sep. 19, 2014

(65) Prior Publication Data

US 2015/0083983 A1    Mar. 26, 2015

Related U.S. Application Data

(60) Provisional application No. 61/880,911, filed on Sep. 21, 2013.

(51) Int. Cl.
*H02G 1/08* (2006.01)
*H02G 1/06* (2006.01)
*B65H 57/14* (2006.01)

(52) U.S. Cl.
CPC ............... *H02G 1/06* (2013.01); *B65H 57/14* (2013.01); *B65H 2701/34* (2013.01)

(58) Field of Classification Search
USPC .......... 254/134.3 R; 248/302, 303, 304, 308
See application file for complete search history.

(56) References Cited

U.S. PATENT DOCUMENTS

| | | | | |
|---|---|---|---|---|
| 1,390,023 A | * | 9/1921 | Coon | B66C 1/36 24/600.2 |
| D139,144 S | * | 10/1944 | Ho | 126/25 R |
| D644,091 S | * | 8/2011 | Drazin | D8/367 |
| D686,488 S | * | 7/2013 | Abels | D8/356 |

* cited by examiner

*Primary Examiner* — Joseph J Hail
*Assistant Examiner* — Shantese McDonald
(74) *Attorney, Agent, or Firm* — Jonathan Grant; Grant Patent Services

(57) ABSTRACT

A roller guide for supporting and facilitating the manipulation of cable(s) and wire(s) is presented. The roller guide include a frame and a roller assembly disposed along a length of the frame. The roller assembly includes one or more adjacently disposed roller bearings positioned between at least two stop collars. Each of the roller bearings include a housing disposed in a surrounding relation to a corresponding portion of the frame, and a plurality of rollers rotationally disposed within the housing. The rollers include a convex outer engaging surface structured to substantially matingly align with an inner longitudinal concave surface of the corresponding portion of the frame.

31 Claims, 21 Drawing Sheets

CABLE PULLING ROLLER GUIDE

CLAIM OF PRIORITY/CROSS REFERENCE TO RELATED APPLICATION

The present application is based on and a claim to priority is made under 35 U.S.C. §119(e) to currently provisional patent application Ser. No. 61/880,911, having a filing date of Sep. 21, 2013, the contents of which are incorporated herein their entirety.

FIELD OF THE INVENTION

The present invention is generally directed to a roller guide structured to facilitate the manipulation of cables, wires, and other like elongated members. In particular, the roller guide may be suspended, attached or secured to a support allowing for cables, wires, etc. to pass through the guide and pulled, pushed or otherwise easily organized and/or manipulated.

BACKGROUND OF THE INVENTION

The installation of cable(s), wire(s), etc., including but in no way limited to telephone cables, electrical wires, Ethernet or computer networking cables (e.g., CAT5 or CAT6 cables), power cables, and speaker wire, can be cumbersome and difficult especially in the event the cables become entangled, unorganized, and/or knotted. Oftentimes, the installation or organization of cables and wires may span a long distance across one or more rooms, throughout the ceiling or attic of a home or building, between walls, across a warehouse, etc. It is generally difficult to organize, manipulate and/or pull the cables or wires these great distances, causing the wires to become entangled or requiring the technician to continuously span the distance to incrementally pull the cables or wires along.

Particularly, when cable technicians install bundles of cables or wires on a cable tray, for example, within the ceiling of a building, at least two technicians are usually required to complete the task. Specifically, one technician may push or manipulate the cables or wires from a first location (e.g., the location of origin), and the other technician may pull the cables or wires toward the second location (e.g., the destination) using pulling rods and/or string or other devices connected to the head of the cable, wire or bundle. The technicians should be careful to avoid obstacles (e.g., sharp edges, corners, etc.) that may cause "burn" and "tear" of the cables. For instance, at the corners or turning points of the cable tray, the cables may rub against edegs, orners or sides creating a resistance force along the cables and causing the cables to "burn" and "tear."

Accordingly, there is a need in the art for an improved cable pulling roller guide which can be positioned along the path of the cable or wire, including, but not limited to the corners, edges or turns along the cable tray. The cable or wire can be disposed through an opening of the roller guide and pulled there through as desired. The proposed roller guide may also include a roller assembly comprising one or more roller bearings structured to facilitate the manipulation of the cable or wire there through. The roller bearings may, but need not include needle bearings or needle rollers with partial or full curvature substantially matching the curvature of the opening upon which the bearing is disposed.

SUMMARY OF THE INVENTION

The present invention is generally directed to a cable pulling roller guide for facilitating the manipulation of cable(s), wire(s) or other elongated member(s) there through. Particularly, the roller guide of the various embodiments includes a frame defining at least one opening for disposition of the cable(s), wire(s), etc. A roller assembly is disposed or affixed along a portion of the frame that at least partially defines the opening in order to provide one or more roller bearings that may be used to facilitate the movement of cable(s), wire(s), etc. thereon.

Particularly, the roller assembly may include a plurality of adjacently disposed roller bearings that circumferentially rotate about the frame as the cable(s), wire(s), etc. are pulled or moved through the opening. Stop collars may be provided at the ends of the roller assembly in order to restrict or prevent longitudinal movement of the roller bearings along the frame. Accordingly, the stop collars may be fixedly secured to the frame, wherein the various roller bearings are disposed in an at least partially side-by-side or adjacent manner there between. Due to the adjacent or side-by-side placement of the roller bearings and the stop collars, the roller bearings are restricted from longitudinal movement along the frame, although a slight clearance or space between the roller bearings may be provided to allow for slight longitudinal shifting.

Each of the roller bearings of at least one embodiment are constructed of a housing with a plurality of elongated needle bearings positioned therein along the circumference of the frame 20 allowing the bearings to rotate about the circumference of the frame. The rollers of at least one embodiment include a full curvature configuration in that the outer engaging surface of the rollers include a longitudinal curvature from end to end and perpendicular to the rotational direction of the roller, or otherwise, parallel to the axis of rotation.

The opening of the frame through which the cable(s), wire(s), etc. are positioned is at least partially defined by an inner longitudinal concave surface with a corresponding longitudinal curvature upon which the roller assembly is disposed. Accordingly, in one embodiment, the curvature of the needle rollers may be constructed to matingly align with the curvature of the frame or portion of the frame upon which the corresponding bearing is disposed. In this manner, the longitudinal convex curvature of the rollers may match or substantially equal the concave curvature of the inner surface of the frame at least partially defining the opening. In use, the load or force from the cables or wires disposed through the opening of the frame is exerted upon the roller assembly at or near the inner surface of the frame, defining the opening. Thus, the corresponding curvatures or configurations of the inner portion of the frame (were the force of the cables is exerted) and the rollers increases the point of contact or contact surface between the rollers and the frame, and therefore creates a substantially stable configuration between the rollers and the frame. This results in little to no vibration, rocking, or shaking of the roller bearings, particularly when one or more cable(s), wire(s), or other elongated member(s) are forcible manipulated through the opening of the frame and along the roller assembly thereof.

Furthermore, in at least one embodiment, the housing of the bearings include an inner raceway surface, such that the rollers are positioned between the frame of the roller guide and the inner raceway surface of the bearing housing. The inner raceway surface may be configured with a curvature that may be matingly aligned with the curvature of the rollers. Thus, the inner raceway surface of the housing may include a longitudinal concave curvature substantially equal to the longitudinal convex surface of the rollers such that a mating alignment may be accomplished there between. This also facilitates a substantially stable and sturdy configuration between the rollers and the raceway surface of the bearing housing, particularly when one or more cable(s), wire(s), or other elongated member(s) are forcible manipulated through the opening of the frame and along the roller assembly thereof.

It should be noted that the frame or ring of the roller guide may be virtually any size and include virtually any diameter or curvature radius. As an example, the roller guide or opening thereof may include an eight inch diameter or larger which can support a bundle in excess of sixty (60) CAT6 cables at a time. Other implementations may be smaller, such as a bundle of three CAT6 cables through a three inch diameter ring or opening. It should be apparent that other dimensions and configurations may be implemented within the full spirit and scope of the various embodiments of the present invention.

These and other objects, features and advantages of the present invention will become more apparent when the drawings as well as the detailed description are taken into consideration.

BRIEF DESCRIPTION OF THE DRAWINGS

FIG. 1 is a side view of the roller guide disclosed in accordance with at least one embodiment, attached to a support and with a plurality of cables disposed there through.

FIG. 6A is a perspective view of the roller guide disclosed in yet another embodiment of the present invention attached to a support and with a plurality of cables disposed there through.

Like reference numerals refer to like parts throughout the several views of the drawings provided herein.

DETAILED DESCRIPTION OF THE INVENTION

Figure 1:
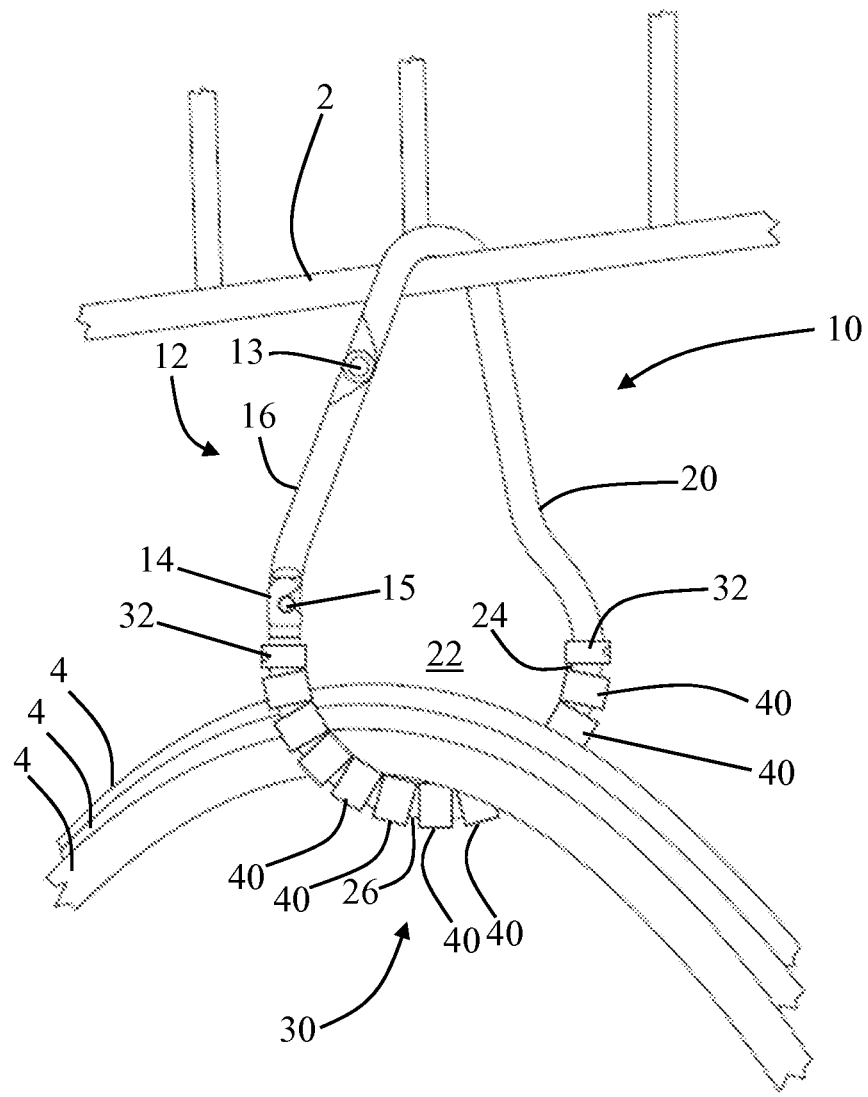

As shown in the accompanying drawings, and with particular reference to FIG. 1, at least some embodiments of the present invention are directed to a roller guide, generally referenced as 10. Particularly, the roller guide 10 comprises a frame 20 that can be secured to a support structure 2, such as a railing, fence, beam, etc., and a roller assembly to facilitate manipulation of cable(s), wire(s), or other elongated member(s) 4 there through. Moreover, as shown in the exemplary embodiment illustrated in FIG. 1, the roller guide 10 may include a carabineer or other clip or hook structured to facilitate the practice of the present invention in the intended manner, although other clips, hooks, rings, etc. are contemplated within the full spirit and scope of the various embodiments of the present invention.

For example, in one embodiment, the roller guide 10 may include a latch assembly 12 disposable between an at least partially open (FIG. 2A) and a closed (FIGS. 1 and 2B) configuration. The latch assembly of the various embodiments 12 may include a spring or otherwise biased hinge 13 structured to normally dispose the latch assembly 12 in the closed configuration. Although, it should be noted that the latch assembly 12, and in particular, the hinge 13 thereof, need not be biased in order for the various embodiments of the present invention to function. Further, a hook or closure device 14 may engage a locking pin 15 in order to retain the latch assembly 12 in the closed configuration. Other closure mechanisms may be implemented, and certain embodiments may not include a latch assembly or closure mechanism.

Moreover, as will be apparent from the description provided herein, the frame 20 of the various embodiments of the present invention is structured to define at least one opening 22 through which one or more cables, wires, or other elongated members 4 can pass. Furthermore, the roller guide 10 of the present invention includes a roller assembly 30 disposed along a length of the frame 20, for instance, in communication with a portion of the opening 22. The roller assembly 30 comprises at least one rotationally disposed bearing 40 engagable by or otherwise contacted by the cable(s), wire(s) or other elongated member(s) 4 disposed through the opening 22. The roller assembly 30, of the various embodiments, is therefore structured and disposed to facilitate the easy manipulation or pulling of the elongated member(s) 4 through the roller guide 10, as desired or as needed. For instance, as the elongated member(s) 4 are pulled or manipulated though the opening 22, the elongated members(s) 4 will contact or engage the roller bearings at a location within the opening 22 causing a load or force to be exerted upon the roller bearings against the inner portion or surface of the frame 20 or opening 22. This causes the roller bearings 40 of the roller assembly 30 are structured to rotate circumferentially about the frame 20, thereby allowing the elongated member(s) 4 to be easily pulled or manipulated there through.

Further embodiments of the present invention also include a cable guide 100, which in some cases, may not include a roller assembly. In such an embodiment, the cables, wires or other elongated members 4 may be passed through or into the opening 22 and guide along the inner surface of the frame 20 or opening. Absent the roller assembly, the cable guide may preferably be used for smaller cables, wires, etc. or small bundles thereof.

Figure 2A:
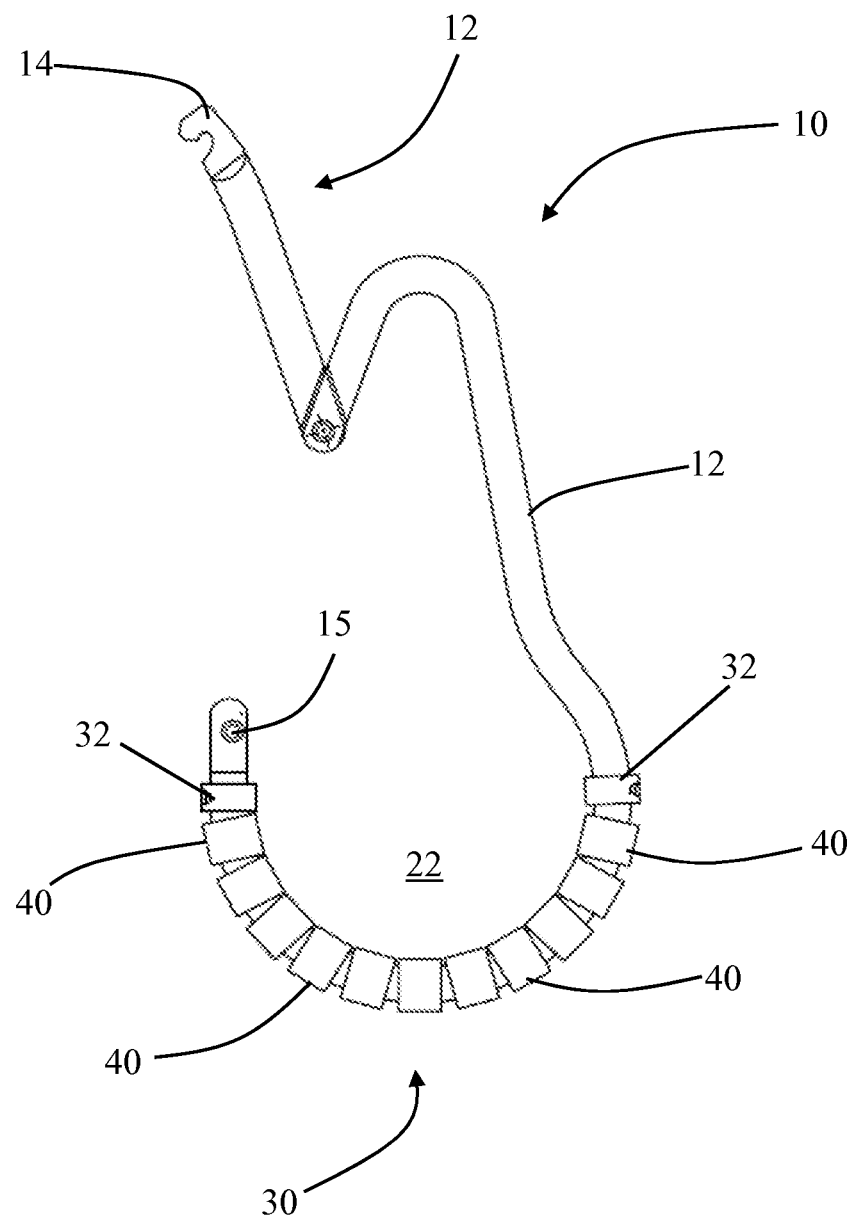
FIG. 2A is a side view of the roller guide illustrated in FIG. 1 with the latch assembly disposed in an open configuration.
Figure 2B:
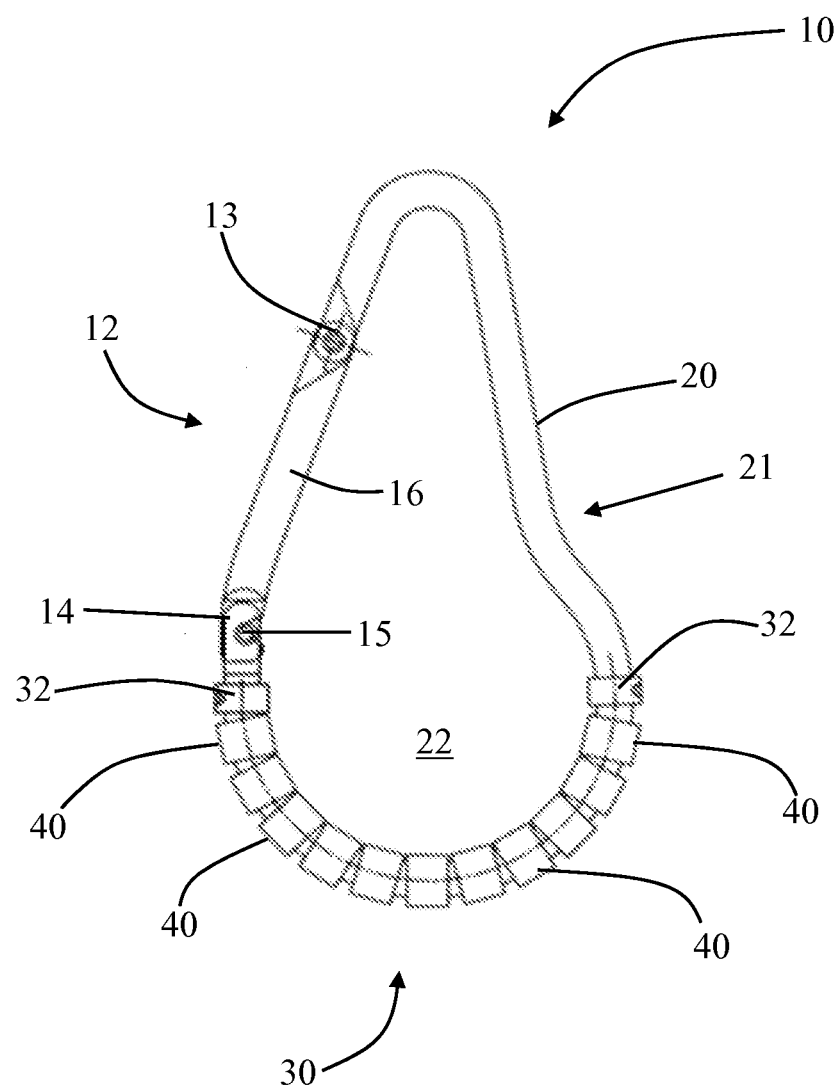
FIG. 2B is a side view of the roller guide illustrated in FIGS. 1 and 2A with the latch assembly disposed in a closed configuration.
Figure 3A:
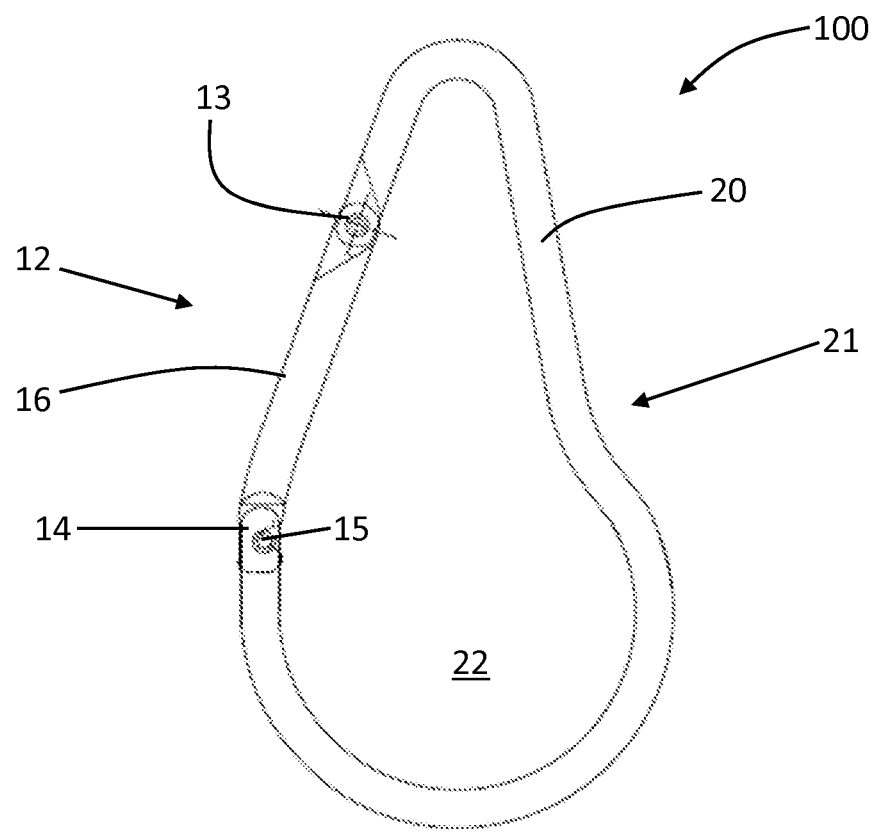
FIG. 3A is a side view of a cable guide with an outward latch assembly as disclosed in accordance with another embodiment of the present invention.
Figure 3B:
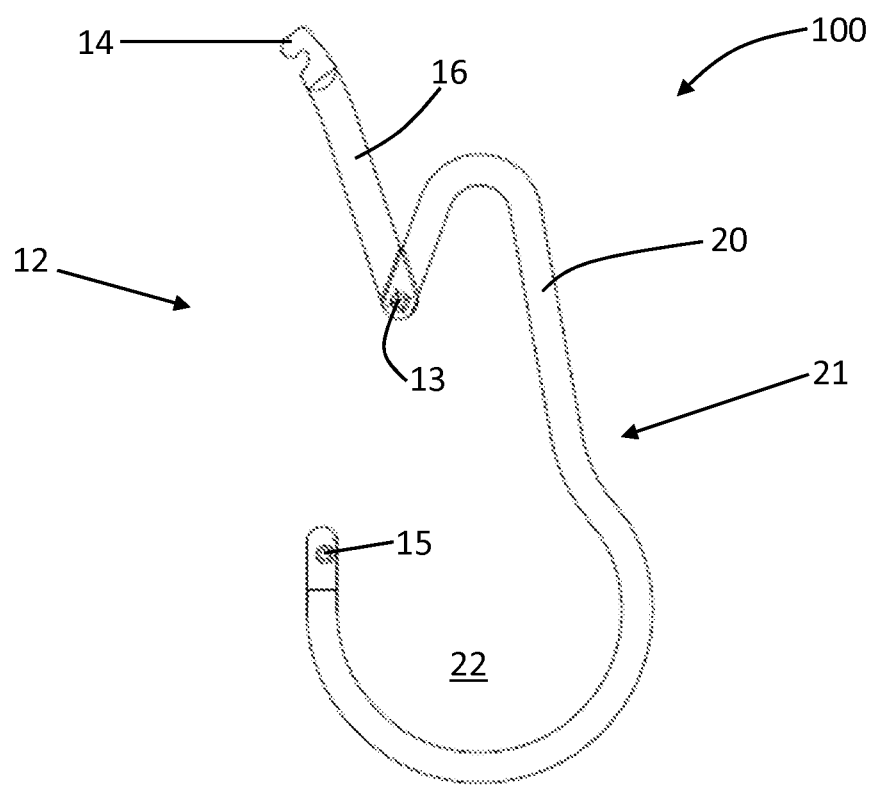
FIG. 3B is a side view of the embodiment illustrated in FIG. 3A with the outward latch assembly disposed in an open configuration.

Referring to the exemplary embodiments of FIGS. 1, 2A and 2B of the roller guide 10 and FIGS. 3A and 3B of the cable guide 100, the latch assembly 12 includes a latch arm 16 pivotally disposed between an open and a closed configuration. In the embodiment shown, the latch arm 16 comprises a substantially linear configuration (with a slight bend or curve), although other configurations or shapes are contemplated. Opening the latch arm 16 may be accomplished by pulling the latch arm 16 outward and away from the remaining portions of the frame 20, for example, against the biased or other hinge 13. For example, disposition of the latch arm 16 outward and away from the opening 22 will disengage the latch hook 14 from locking pin 15, or other closure mechanism. This will allow the user to mount the roller guide 10, for example, on a railing, beam or other support surface or structure 2 and/or to position one or more cable(s), wire(s) or elongated member(s) there through. Furthermore, it should be noted that the outward disposition of the latch arm 16 makes it easy to unload or remove a bundle of cables from the opening 22 in that the cables or other elongated members 4 are unlikely to become hindered by or tangled/engaged with the latch arm 16 when the latch arm 16 is outwardly disposed from the opening 22.

As shown in FIG. 1, the roller guide 10 may be suspended from the support surface 2 such that the roller assembly 30 is positioned on a lower section of the frame 20, as illustrated. However, it should be noted that the roller guide 10 may instead be secured in virtually any angle or orientation, often depending on the location, orientation, or structure of the support 2.

Figure 4A:
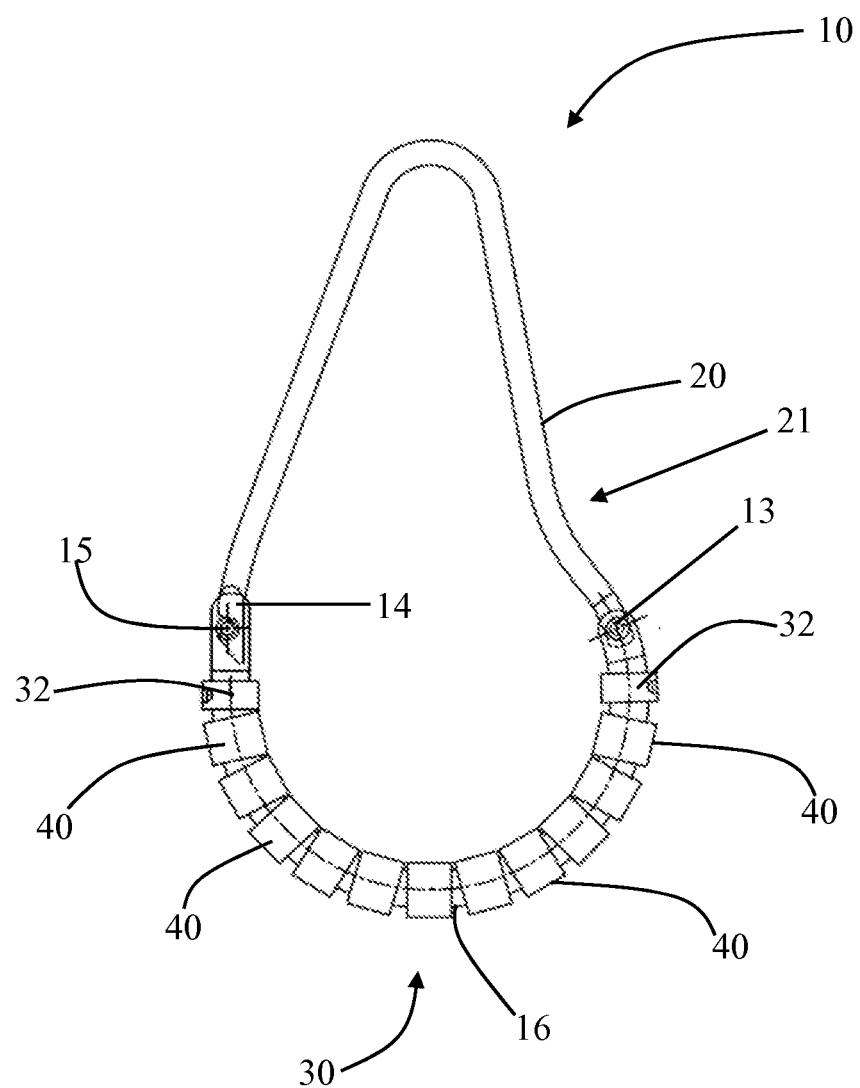
FIG. 4A is a side view of the roller guide as disclosed in accordance with at least another embodiment of the present invention.
Figure 4B:
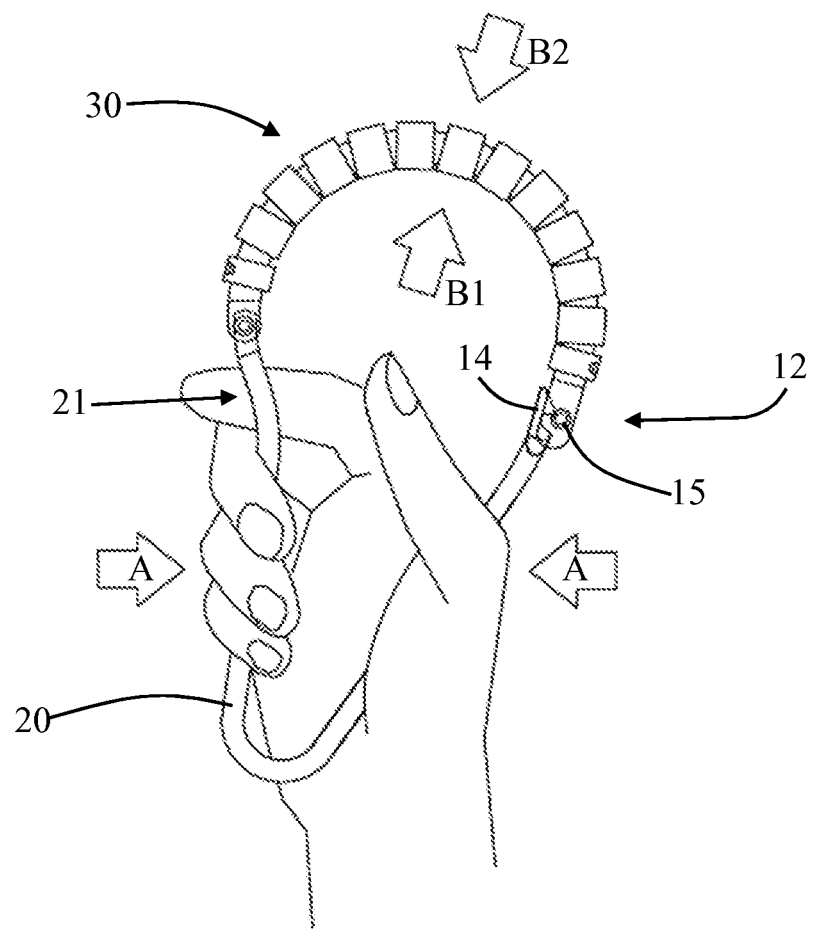
FIG. 4B is a side view of the roller guide illustrated in FIG. 4A, shown single-handed use thereof.
Figure 4C:
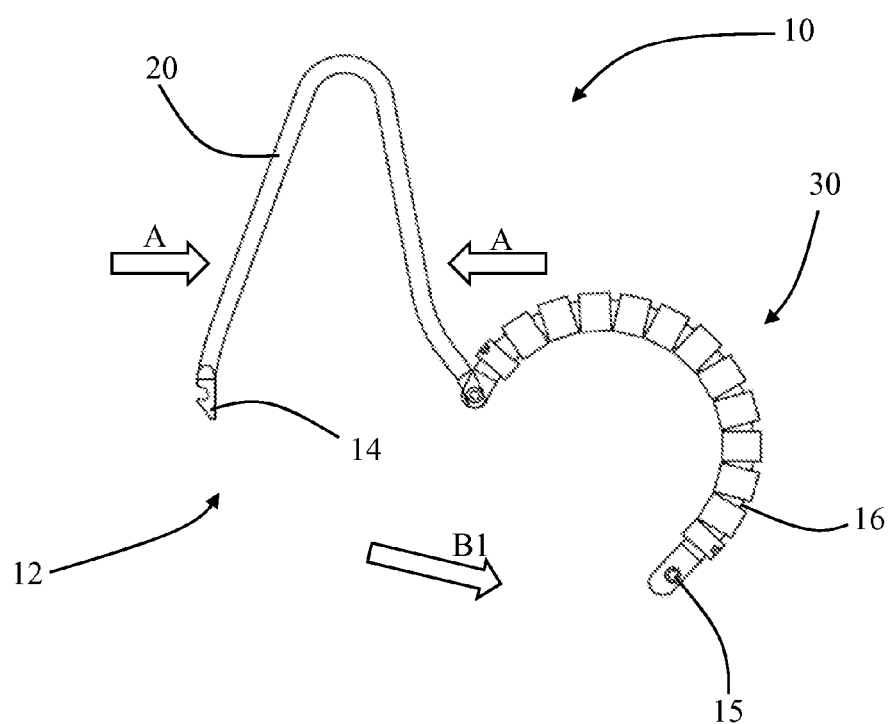
FIG. 4C is a side view of the roller guide illustrated in FIGS. 4A and 4B with the latch assembly disposed in an open configuration.
Figure 5A:
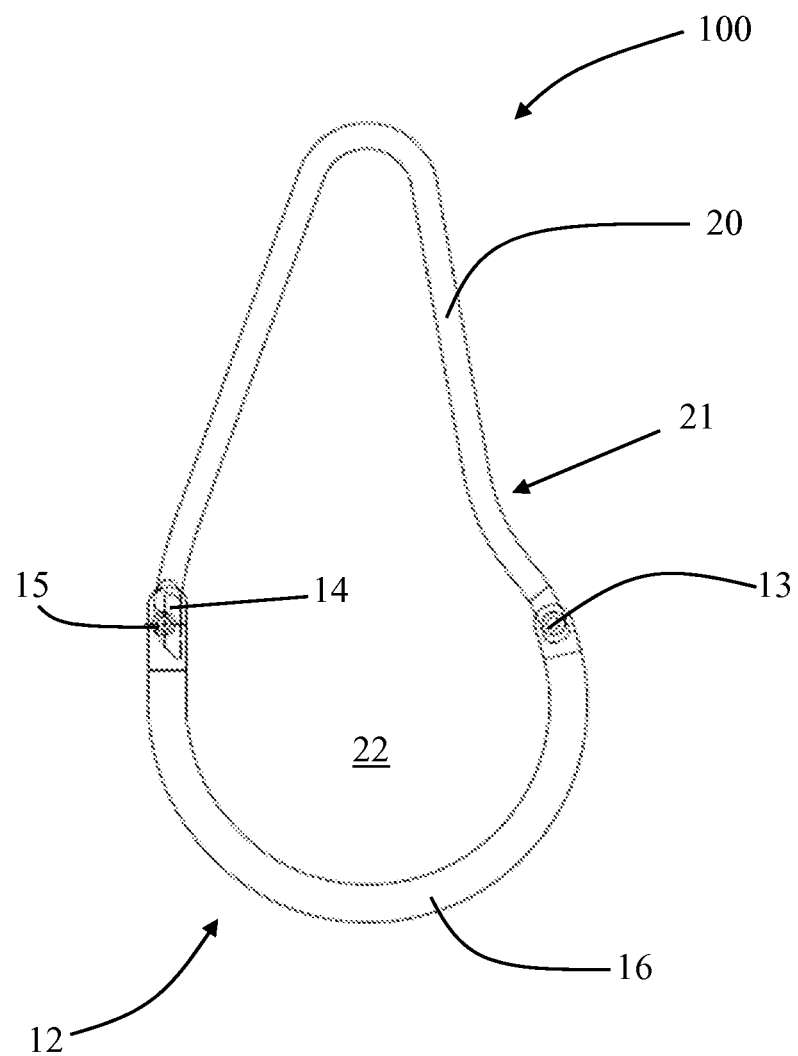
FIG. 5A is a side view of a cable guide with an outward latch assembly as disclosed in accordance with another embodiment of the present invention.
Figure 5B:
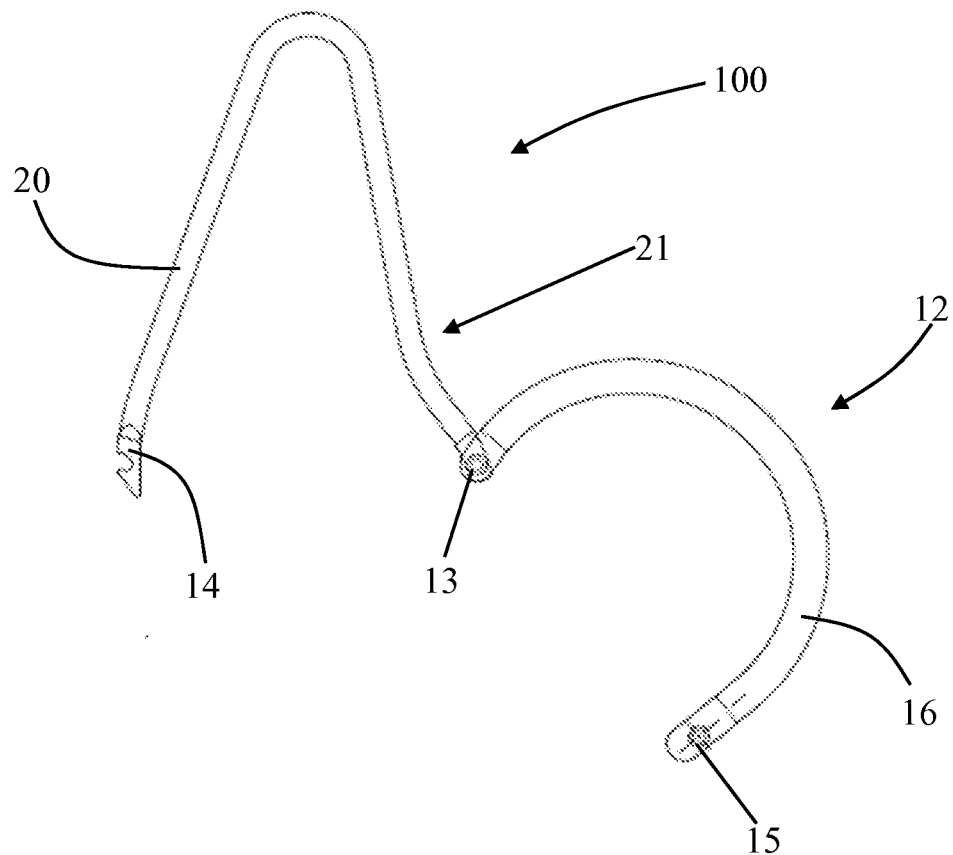
FIG. 5B is a side view of the embodiment illustrated in FIG. 5A with the outward latch assembly disposed in an open configuration.

Referring now to the roller guide 10 shown in FIGS. 4A, 4B and 4C, and the cable guide 100 shown in FIGS. 5A and 5B, a modified or different latch assembly 12 is presented. For instance, in the particular embodiment, shown in FIGS. 4A, 4B and 4C, the roller assembly 30 may be disposed substantially between the hinge 13 and the locking pin 15 or closure hook 14. Further, the latch arm 16 may include a substantially curved or rounded configuration defining the opening 22. In this embodiment, the hinge 13 may, but need not be biased. Rather, the locking pin 15 and closure hook 14 may be structured to maintain the roller guide 10 in the closed configuration.

Opening the latch assembly 12 may be accomplished by lightly squeezing the sides of the frame 20 indicated by arrows A and pulling outward in the direction indicated by arrow B1. In particular, the frame 20 of at least one embodiment may include a bend, contoured configuration, or angle referenced at 21 allowing a user to easily grip the frame 20 with one hand, squeeze in direction A, and open the latch assembly 12. For example, upon slightly squeezing or applying pressure on the frame 20 in direction A, the closure mechanism of the latch assembly 12 may become disengaged in that the latch arm 16 may be at least partially disengaged from the frame 20 and opened or pulled outward from the frame 20 or opening 22. Specifically, the hook 14 may become disengaged from the pin 15 via squeezing on the frame 20 and pulling outward on the latch arm 16. As before, the outward disposition of the latch arm 16 allows the user to easily remove any cables, wires, etc. from the opening 22 thereof without accidental or unwanted engagement of the cables, wires, etc. with the latch arm 16.

Further, the bend or contour 21 may be disposed proximate the hinge 13, as shown in FIGS. 4A through 5B, although other embodiments may also or instead include a bend or contour 21 proximate the closure hook 14. Closing the latch assembly 12 may be accomplished by again applying manual pressure or squeezing force in the direction of arrows A and then directing the opened portion of the frame in direction B2 until the latch assembly 12 locks, or until the closure hook 14 attaches with the locking pin 15, for example.

Figure 6A:
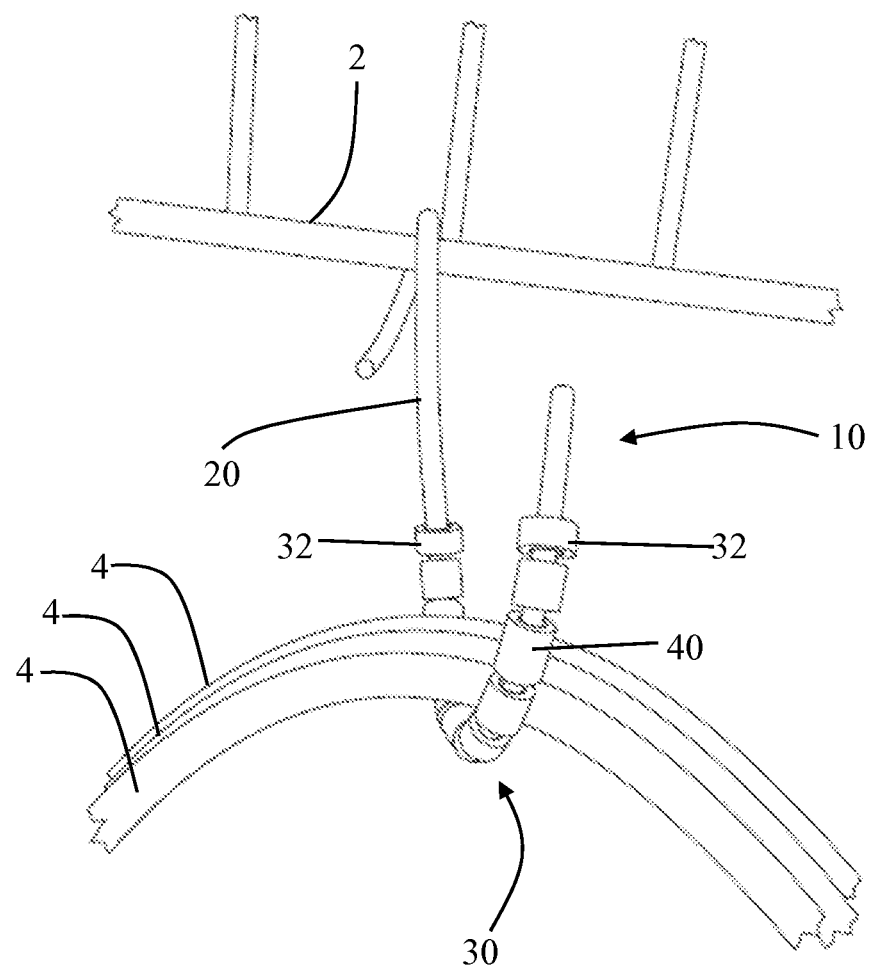
Figure 6B:
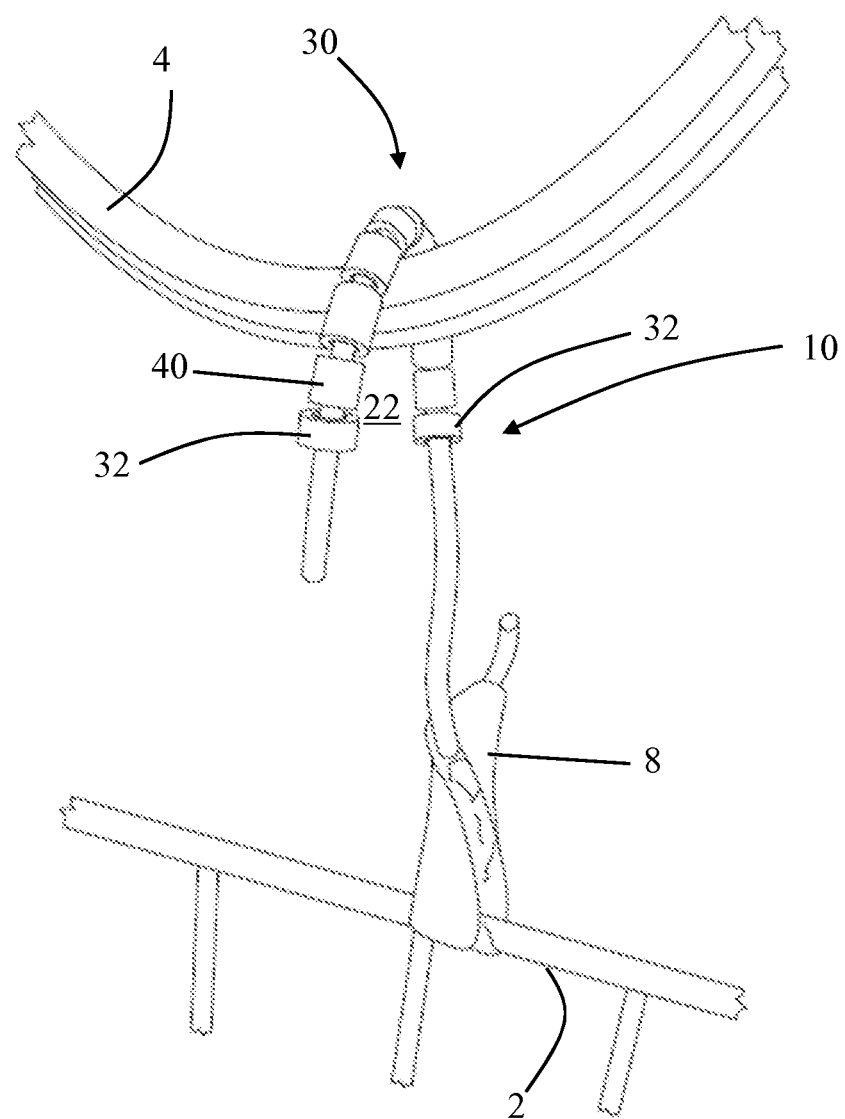
FIG. 6B is a perspective view of the roller guide illustrated in FIG. 6A attached to a different support.
Figure 6C:
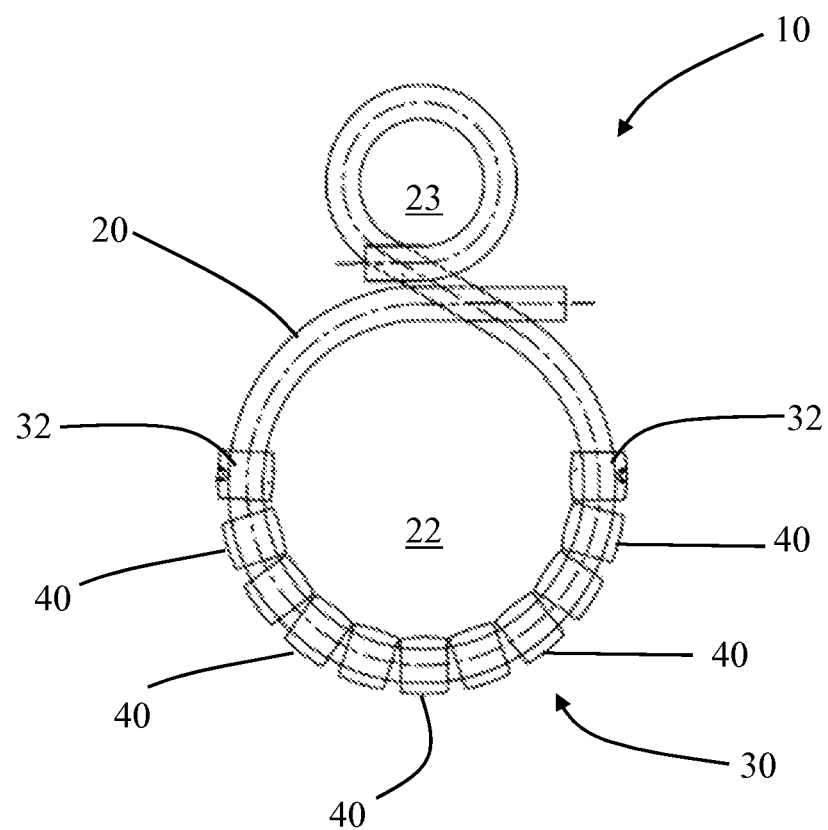
FIG. 6C is a side view of the roller guide as disclosed herein and as illustrated in FIGS. 6A and 6B.
Figure 6D:
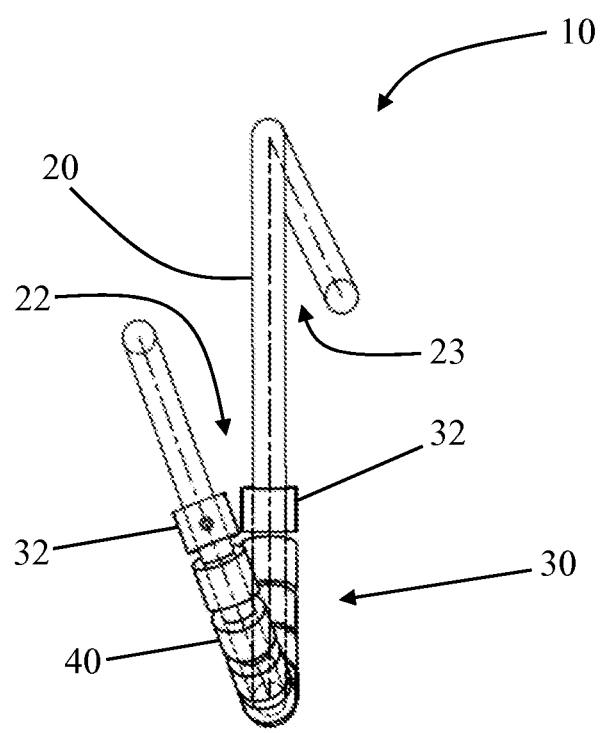
FIG. 6D is a front view of the roller guide as disclosed herein and as illustrated in FIGS. 6A, 6B and 6C.
Figure 7A:
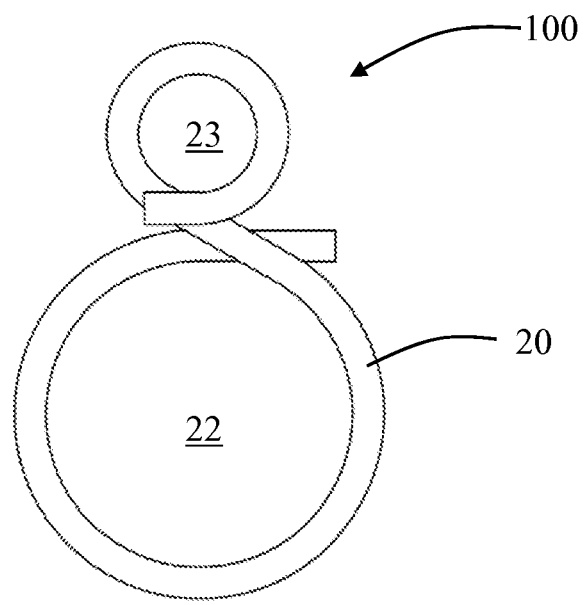
FIG. 7A is a side view of yet another embodiment of the cable guide as disclosed herein with an always open configuration.
Figure 7B:
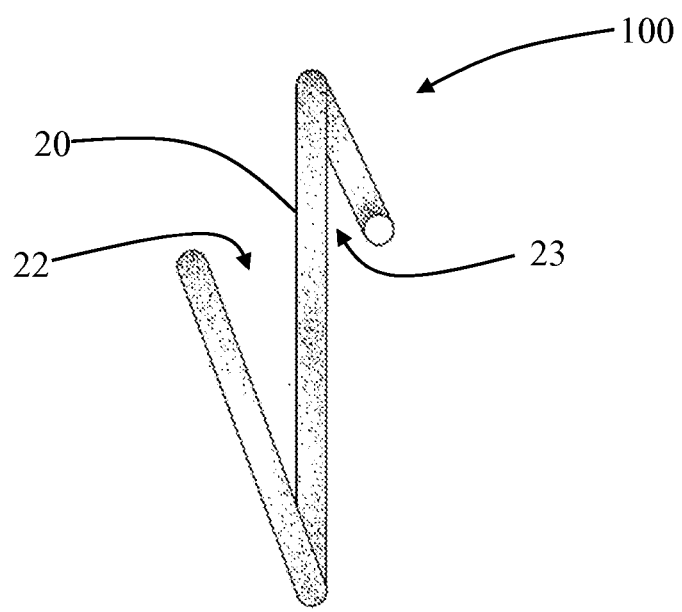
FIG. 7B is a front view of the embodiment illustrated in FIG. 7A.

Referring now to the roller guide of FIGS. 6A through 6D and the cable guide of FIGS. 7A and 7B, yet another frame configuration is illustrated. In particular, the frame 20 may include an always-open configuration allowing the roller guide 10 to be hooked onto the support 2, as shown in the exemplary illustrations of FIGS. 6A and 6B. For instance, the frame 20 of at least one embodiment may be in the form of a bridle ring, or other ring, hook, etc. comprising an always-open configuration. The frame 20 may be structured to define two separate openings; one opening 22 for disposition of the cable(s), wire(s), or other elongated member(s) 4, and a second attachment opening 23 for attachment to a support 2, such as a cable tray, beam, etc. Both of the openings 22, 23 may include an always-open configuration, as illustrated in the figures to facilitate easy loading and unloading (with regard to the cables, etc.), and easy attachment and detachment (with reference to the support 2).

Additional structural variations of the present invention may include an auxiliary support member 8 which may be disposed between the support 2 and the frame 20, as shown in FIG. 6B, for example. The auxiliary support member 8 may be used to facilitate interconnection between the frame 20 and the support 2, for example, in situations where the support 2 may be too far away from the cable(s), wire(s) or other elongated member(s) 4. In this manner, the auxiliary support member 8 may be used as an extension to attach or secure the frame 20 to a support 2 that may not generally be in reach of the frame 20. It should be noted that the auxiliary support member 8 may include a VELCO attachment strip, snaps, clips, hooks, etc., although other structures may be implemented within the full spirit and scope of the present invention.

Moreover, the roller assembly 30 disclose din accordance with at least some of the embodiments herein may include at least one roller bearing 40 disposed between two stop collars 32, although a plurality of adjacently disposed roller bearing 40 may be preferred. The stop collars 32 of at least one embodiment are fixedly secured to the frame 20 of the roller guide 10 and are structured to restrict or prevent longitudinal movement of the roller bearing(s) 40 along the length of the frame 20. For example, the stop collars 32 of at least one embodiment may include a ring or other enlarged end secured to the frame via one or more fasteners (e.g., screws, pins, etc.) Other embodiments may include one or more stop collars 32 integrated or otherwise manufactured as part of the frame 20. In this manner, the roller bearings 40 are sandwiched between the stop collars 32 and are thus prevented or restricted from moving along the frame 20. As should be apparent, rotational movement of the roller bearings circumferentially around the frame 20 is still accomplished.

Figure 8:
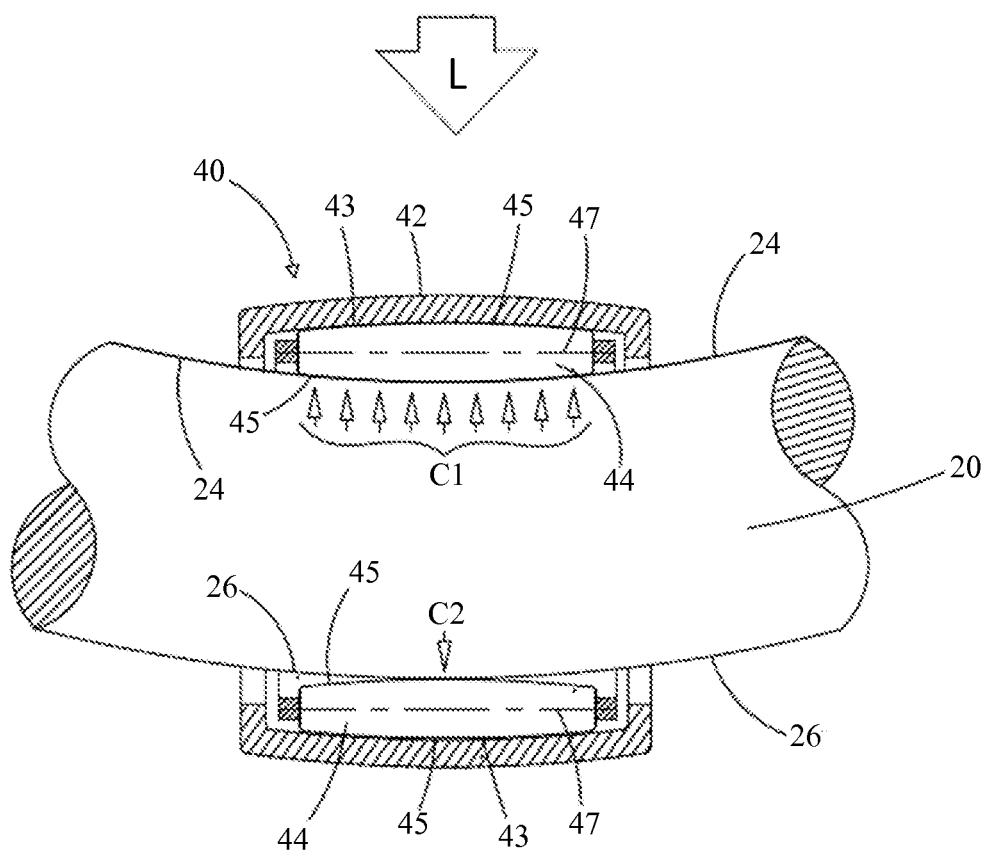
FIG. 8 is a partial cut-away view of a roller bearing and frame as disclosed in accordance with at least one embodiment of the present invention.
Figure 9:
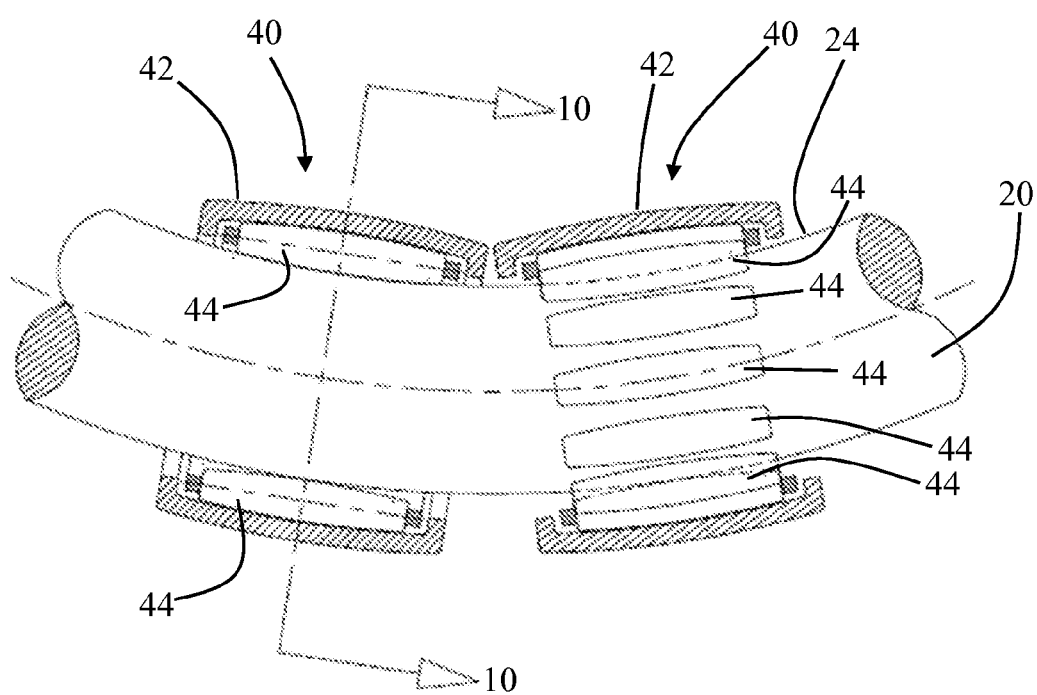
FIG. 9 is another partial cut-away view of a roller bearing and frame as disclosed in accordance with at least one embodiment of the present invention.
Figure 10:
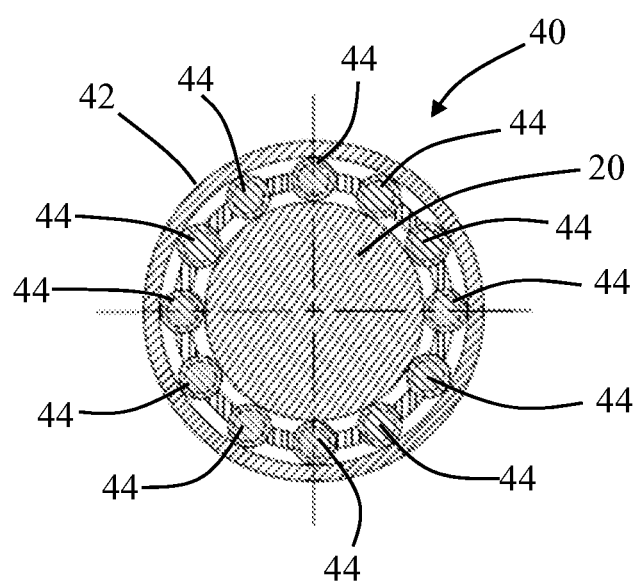
FIG. 10 is a partial cut-away view of the roller bearing and frame illustrated in FIG. 9 along line 10-10.

For instance, as shown in FIGS. 8 through 10, the roller bearings 40 include a housing 42 disposed in a surrounding relation to a portion of the frame 20. A plurality of rollers 44 are rotationally disposed within the housing 42 and are structured to engage the frame 20 as the roller bearings 40 rotate about the frame 20. Particularly, each of the plurality of rollers 44 of a single or common roller bearing 40 include an outer engaging surface 45 which is structured to contact or engage the surface of the frame 20 as the roller bearing 40 rotates about the frame 20.

Particularly, the portion of the frame 20 defining the opening 22 includes an inner longitudinal concave surface 24 upon which a load or force is applied by cable(s), wire(s), etc. forcibly disposed there through. Accordingly, the roller assembly 30 of at least one embodiment is positioned along the portion of the frame 20 defined by the inner longitudinal concave surface 24 and corresponding oppositely disposed exterior convex surface 26 in order to receive the load from the cable(s), wire(s), etc. and facilitate the manipulation of the same through the opening 22. Further, it should be apparent that the inner longitudinal concave surface 24 of the frame 20 is defined by or otherwise includes a curvature, such as a longitudinal concave curvature.

Still referring to FIG. 8, in at least one embodiment, the outer engaging surface 45 of the plurality of rollers 44 is structured and configured to substantially matingly align with the inner longitudinal concave surface 24 of the frame 20 or portion of the frame 20 upon which the particular roller 44 engages. In this manner, the outer engaging surface 45 of the rollers 44 include a curvature, such as a longitudinal convex curvature, that aligns with or is otherwise substantially equal to the curvature of the inner surface of the frame 20, upon which the load of the cable(s), wire(s), etc. is applied. Thus, the longitudinal convex curvature of the rollers 44 extends in a direction perpendicular to the rotational direction of the rollers 44 about the frame 20, or otherwise along the axis of rotation 47.

Accordingly, the substantial mating alignment between the curved rollers 44 and the surface of the frame 20 creates a stable connection or engagement between the bearings 40 and the roller guide 10 or frame 20 thereof, particularly as cable(s), wire(s), or other elongated member(s) 4 are pulled through the opening 22 and along the bearings 40. For instance, still referring to FIG. 8, the load, referenced as L, exerted by the cable(s), wire(s), or other elongated member(s) 4 disposed through the opening of the frame 20 will be exerted upon the inner longitudinal surface 24 of the frame 20 and the rollers 44 at the inner longitudinal surface 24. The mating alignment or correspondingly configured curvatures of the rollers 44 and the inner longitudinal surface 24 increases or maximizes the surface contact, referenced as C1, between the rollers 44 and the surface of frame 24 upon which the force or load L is exerted. The substantial or full contact between surfaces 45 and 24 of the rollers and frame, respectively, creates a stable relation and minimizes shaking, vibration, etc. of the rollers 44 and/or bearings 40 as the cable(s), wire(s), or other elongated member(s) 4 are forcibly drawn or manipulated though the opening of the frame 20.

As the rollers 44 circumferentially rotate about the frame 20, the contacts between the rollers 44 and the frame 20 change as the longitudinal curvature of the frame surface changes. However, in at least one embodiment, for example, wherein the rollers include a full longitudinal curvature configuration, the center or central portion of the rollers 44 will remain in contact with the surface of the frame. For instance, as shown in FIG. 8, the exterior convex surface 26 of the frame 20 and the rollers 44 contact at the center, represented by C2. Furthermore, FIG. 10, which is a cutaway view represented by line 10-10 in FIG. 9, shows the center portion of the rollers 44 in contact with the frame 20 at all locations throughout the rotational disposition of the rollers 44 about the frame 20.

It should also be noted that in certain embodiments, the curvature of the rollers 44 may be slightly less than the curvature of the inner portion of the frame 20, creating a negative tolerance. Particularly, the curvature or arc of the surface 45 of the rollers 44 may be defined by a radius or diameter which is slightly less than or equal to the radius or diameter defining the curvature of arc of the inner surface 24 of the frame 20. In this manner, the center portion of the rollers 44 will continue to contact the surface of the frame, although there may be a small space or tolerance at the edges.

Further structural features of the present invention include a substantially mating alignment between the curved outer engaging surface 45 of the rollers 44 and the inner raceway surface 43 of the bearing housing 42. For instance, the housing 42 of the bearings 40 include an inner raceway surface 43, such that the rollers 44 are disposed or sandwiched between the inner raceway surface 43 and the frame 20. Accordingly, in at least one embodiment, the inner raceway surface 43 of the housing 42 may include a longitudinal concave curvature that substantially matingly aligns with the longitudinal convex curvature of the rollers 44. Thus, the curved surface 45 of the rollers 44 and the inner raceway surface 43 of the housing 42 may be substantially equal or substantially similar.

For example, in at least one embodiment the curvature or arc of the inner raceway surface 43 of the bearing housing 42 may be substantially equal to the curvature or arc of the inner longitudinal surface 24 of the frame 20. This allows the convex curved rollers 44 to be matingly disposed between the correspondingly configured concave surfaces defined by the inner raceway surface 43 of the bearing housing 42 and the inner longitudinal surface 24 of the frame. Further, the curvature or arc of the convex surface 45 of the rollers 44 maybe defined by a radius or diameter which is slightly less than or equal to the radius or diameter defining the curvature or arc of the inner raceway surface 43 of the housing 42 and the inner longitudinal surface 24 of the frame 20.

Still referring to FIGS. 8 and 9, as the rollers 44 rotate about the circumferential surface of the frame 20, the longitudinally curved surface 45 of the rollers 44 move from an aligned relation (e.g., via the substantially similar curvature of the inner longitudinal concave surface 24) to a partially unaligned relation (e.g., via the exterior longitudinal convex surface 26) with the frame 20. However, the curvature of the inner raceway surface 43 and the curvature of the surface 45 of the rollers 44 will remain substantially aligned throughout the rotational disposition of the rollers 44 about the frame 20. This, again, provides an exceptionally stable bearing along the frame 20, particularly when elongated member(s) 4 are forcibly pulled or manipulated through the opening 22.

Furthermore, as shown in FIGS. 8 and 9, the rollers 44 may include a longitudinally elongated configuration that extends longitudinally along the surface of the frame 20. For example, the rollers 44 may include needle rollers having a full curvature configuration, meaning that the entire longitudinal length of the bearing comprises a curved surface configuration perpendicular to the direction of rotation. This creates full contact between the rollers 44 and the inner longitudinal surface 24 of the frame, as shown at C1. For clarity, FIG. 8 illustrates the axis of rotation 47 as the rollers 44 rotate about the circumference of the frame 20. It is the curved surface configuration that is structured to match or substantially align with the inner curved surface of the frame 20.

In addition, some embodiments of the frame 20 include a constant longitudinal curvature along the length thereof upon which the roller assembly 30 is disposed. For example, referring again to FIG. 1, the longitudinal curvature of the inner surface 24 of the frame 20 may be constant between the stop collars 32, or otherwise in the location where the roller assembly 30 is disposed. For example, the length of the frame 20 upon which the roller assembly 30 is disposed may be defined by a circular arc or an arc having a constant radius. This allows the plurality of roller bearings 40 to each comprise rollers 44 having the same curvature. It should be noted, however, that other embodiments of the frame 20 may include a portion upon which the roller assembly 30 is disposed constructed of or defined by an elliptical arc or one or more arcs having different curvatures along the length thereof. In this manner, the rollers of different roller bearings 30 may comprise different curvatures in order to align with the curvature of the corresponding portion of the frame 20.

Figure 11:
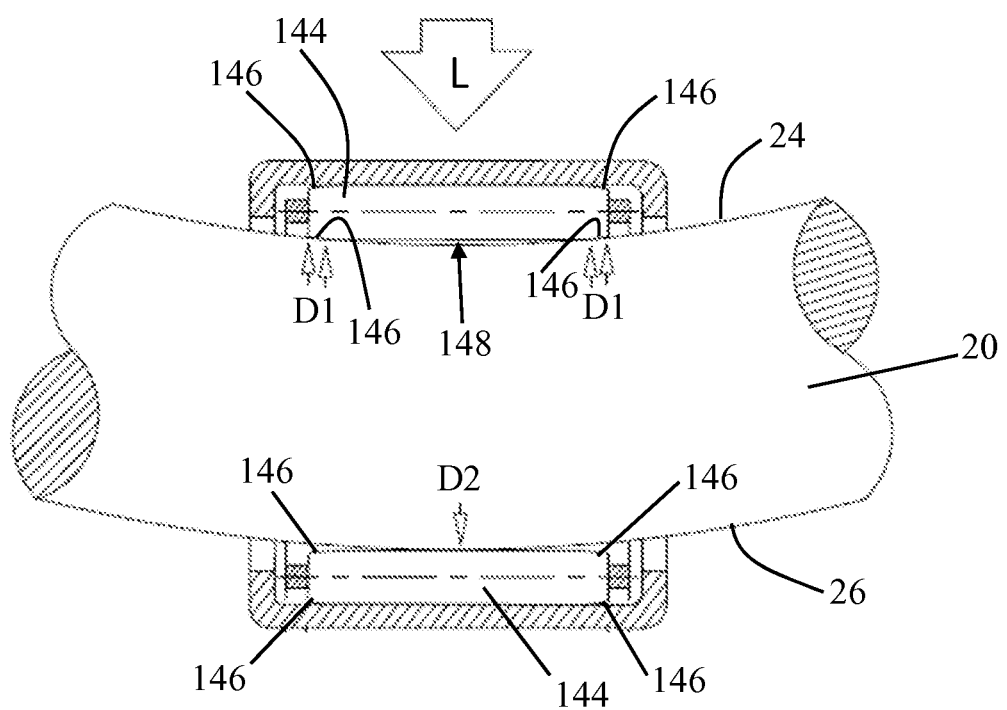
FIG. 11 is a partial cut-away view of another roller bearing and frame as disclosed in accordance with another embodiment of the present invention.

It should also be noted that in certain implementations, the rollers may not have a full curvature along the length thereof. For instance, as shown in FIG. 11, the rollers 144 illustrated include a crowned configuration, meaning that the longitudinal ends 146 may include a curvature or configuration that may at least partially align with or engage the curvature of the inner longitudinal surface 24 of the frame 20. In this manner, the outer ends 146 of the rollers 144 may engage the inner longitudinal surface 24 of the frame, as shown at arrows D1, particularly when a load L is exerted there upon, such as via one or more cable(s), wire(s), or other elongated member(s) 4 forcibly disposed there through. For instance, while the ends 146 may be crowned or curved and engage the inner longitudinal surface 24 of the frame 20, the center of such an implementation of the rollers 144 may be straight, as shown. This creates a space or clearance 148 between the center portion of the roller 144 and the inner longitudinal surface 24 of the frame 20. As the roller 144 is rotationally disposed around the frame 20, the ends 146 lose contact with the surface of the frame 20 and the center portion may, at some locations about the frame 20, engage or contact the frame, as shown at D2, for example. This may create a slight shaking or vibration effect as the cable(s), wire(s), or other elongated member(s) 4 forcibly manipulated through the opening 22 of the frame.

Figure 12:
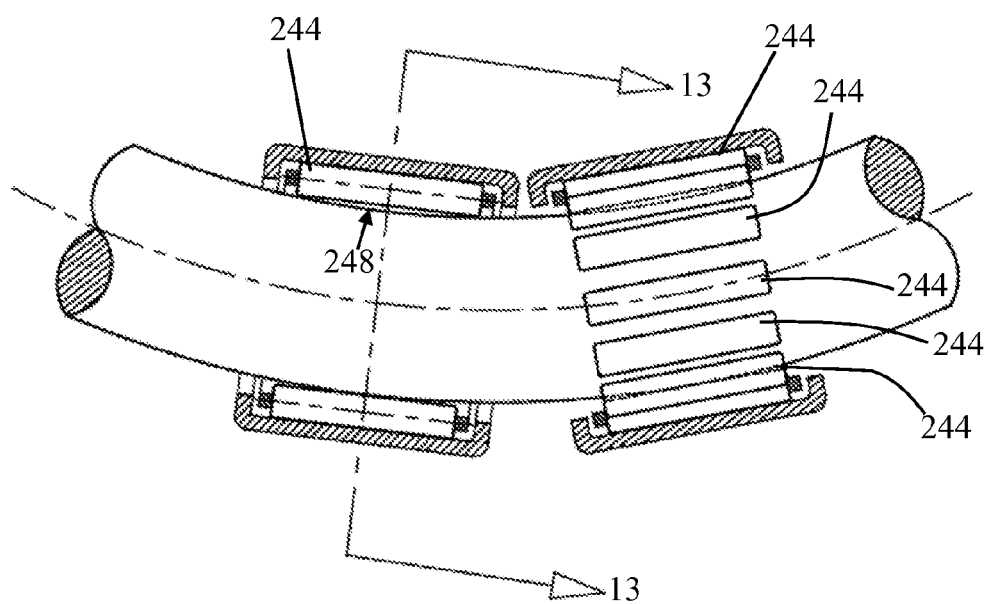
FIG. 12 is a partial cut-away view of yet another roller bearing and frame as disclosed in accordance with yet another embodiment of the present invention.
Figure 13:
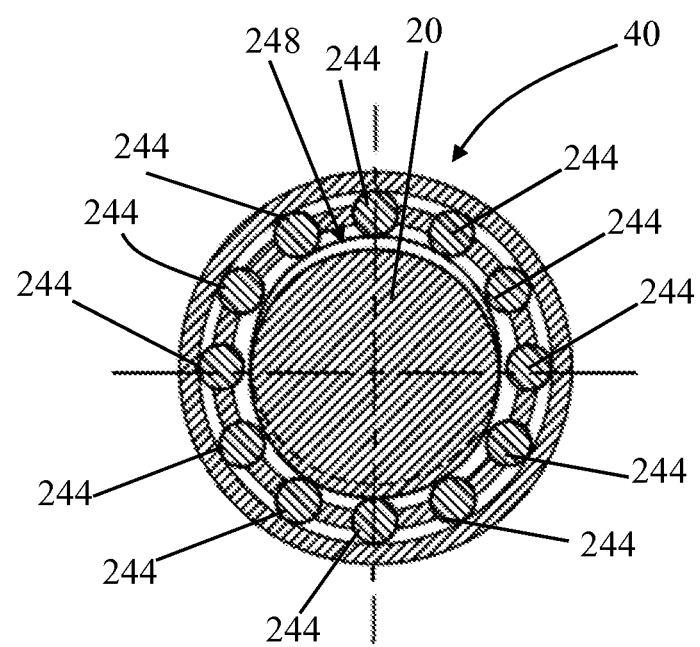
FIG. 13 is a partial cut-away view of the roller bearing and frame along line 13-13 in FIG. 12.

FIGS. 12 and 13 illustrate yet another implementation, wherein the rollers 244 include a generally flat longitudinal configuration. While the inner raceway surface of the bearing housing may include a correspondingly general flat configuration, the surface of the frame 20, particularly at the inner longitudinal surface 24 thereof, remains curved. This creates a larger space or clearance 248 between the central portion of the roller 244 and the inner longitudinal surface 24 of the frame 20. For instance, FIG. 13 illustrates a cross sectional view of FIG. 14 along line 13-13. This cross-sectional view shows the space or clearance 248 created between the rollers 244 and the surface of the frame 20 by the substantially flat configuration, as the rollers rotate circumferentially around the surface of the frame 20.

When the rollers of the roller bearings do not substantially matingly align with the curvature of the inner longitudinal surface 24 of the frame 20, for example, where a force or load is applied, a less stable bearing is created, particularly when cable(s), wire(s) or other elongated member(s) 4 are forcibly pulled though the opening thereof. For instance, when the rollers do not substantially matingly align with the curved surface of the frame 20, for example, at an inner longitudinal surface 24 thereof, the roller bearings may shake or vibrate as the cable(s), wire(s) or other elongated member(s) 4 are pulled there though.

This written description provides an illustrative explanation and/or account of the present invention. It may be possible to deliver equivalent benefits using variations of the specific embodiments without departing from the inventive concept. This description and these drawings, therefore, are to be regarded as illustrative and not restrictive.

Now that the invention has been described,

What is claimed is:

1. A roller guide, comprising a frame having at least one opening at least partially defined by an inner longitudinal concave surface a roller assembly disposed along a length of said frame and engagable by at least one elongated member positioned through said opening, said roller assembly comprising at least one roller bearing positioned between at least two stop collars, said stop collars being fixedly secured to said frame and structured to restrict longitudinal movement of said roller bearing along said frame, said at least one roller bearing comprising a housing disposed in a surrounding relation to a portion of said frame, and a plurality of rollers rotationally disposed within said housing, and said plurality of rollers comprising an outer engaging surface structured to contact said frame and facilitate rotational disposition of said roller bearing about said frame, wherein said outer engaging surface of said plurality of rollers is structured to substantially matingly align with said inner longitudinal concave surface of said frame, wherein said outer engaging surface of said rollers comprises a longitudinal convex curvature substantially equal to a longitudinal concave curvature of said substantially matingly aligned inner longitudinal concave surface of said frame.

2. The roller guide as recited in claim 1 wherein said housing of said at least one roller bearing comprises an inner raceway surface with a longitudinal concave curvature.

3. The roller guide as recited in claim 1 wherein said longitudinal concave curvature of said inner raceway surface of said housing matingly aligns with said longitudinal convex curvature of said outer engaging surface of said rollers.

4. The roller guide as recited in claim 1 wherein said longitudinal convex curvature of said rollers extends across an entire length of said rollers.

5. The roller guide as recited in claim 1 wherein each of said plurality of rollers comprise an elongated configuration.

6. The roller guide as recited in claim 5 wherein each of said plurality of rollers comprise needle rollers.

7. The roller guide as recited in claim 6 wherein said roller assembly comprises a plurality of roller bearings disposed along said length of said frame.

8. The roller guide as recited in claim 7 wherein said longitudinal convex curvature of each of said plurality of rollers is equal to or less than said longitudinal concave curvature of said inner longitudinal concave surface of said frame.

9. The roller guide as recited in claim 8 wherein said longitudinal convex curvature extends along an entire length of a corresponding one of said rollers.

10. The roller guide as recited in claim 1 further comprising a latch assembly selectively disposable between an open and a closed position.

11. The roller guide as recited in claim 1 wherein said roller assembly comprises a plurality of roller bearings adjacently disposed along said length of said frame.

12. The roller guide as recited in claim 11 wherein said inner longitudinal concave surface of said length of said frame upon which said roller assembly is disposed comprises a constant longitudinal concave curvature.

13. The roller guide as recited in claim 12 wherein each of said plurality of rollers of each of said plurality of roller bearings comprise equal longitudinal convex curvatures.

14. The roller guide as recited in claim 13 wherein said length of said frame upon which said roller assembly is disposed is defined by a circular arc.

15. A roller guide, comprising: a frame having at least one opening at least partially defined by an inner longitudinal concave surface, a roller assembly disposed along a length of said frame and engagable by at least one elongated member positioned through said opening, said roller assembly comprising a plurality of adjacently disposed roller bearings positioned between at least two stop collars, said stop collars being fixedly secured to said frame and structured to restrict longitudinal movement of said roller bearings along said frame, each of said plurality of roller bearings comprising a housing disposed in a surrounding relation to a corresponding portion of said frame, and a plurality of rollers rotationally disposed within said housing, each of said plurality of rollers of a corresponding one of said plurality of roller bearings comprising an outer engaging surface structured to contact said corresponding portion of said frame and facilitate rotational disposition of said roller bearing about said frame, wherein said outer engaging surface of said plurality of rollers is structured to substantially matingly align with said inner longitudinal concave surface of said corresponding portion of said frame, said housing of each of said plurality of roller bearings comprises an inner raceway surface with a longitudinal concave curvature, said longitudinal concave curvature of said inner raceway surface of said housing being substantially equal to said longitudinal convex curvature of said outer engaging surface of said rollers.

16. The roller guide as recited in claim 15 wherein said outer engaging surface of said rollers comprises a longitudinal convex curvature substantially equal to a longitudinal concave curvature of said inner longitudinal concave surface of said Corresponding portion of said frame.

17. The roller guide as recited in claim 15 wherein said length of said frame upon which said roller assembly is disposed is defined by a circular arc.

18. The roller guide as recited in claim 17 wherein each of said plurality of rollers of each of said plurality of roller bearings comprise equal longitudinal convex curvatures.

19. The roller guide as recited in claim 15 wherein each of said plurality of rollers comprise an elongated configuration.

20. The roller guide as recited in claim 19 wherein each of said plurality of rollers comprise needle rollers.

21. A roller guide, comprising:
a frame having at least one opening at least partially defined by an inner longitudinal concave surface,
a roller assembly disposed along a length, of said frame and engagable by at least one elongated member positioned through said opening,
said roller assembly comprising at least one roller bearing positioned between at least two stop collars, said stop collars being fixedly secured to said frame and structured to restrict longitudinal movement of said roller bearing along said frame,
said at least one roller bearing comprising a housing disposed in a surrounding relation to a portion of said frame, and a plurality of rollers rotationally disposed within said housing,
a) a contoured upper section comprising a contoured configuration, said contoured configuration being flexible and comprising a contoured handle section forming an extended inverted U shaped structure for one-handed gripping thereof, said contoured configuration further comprising:
   i) a first termination end of said contoured configuration;
   ii) a second termination end of said contoured configuration;
b) a circular like lower section comprising a latch arm, said latch arm further comprising:
   i) a first termination end of said latch arm;
   ii) a second termination end of said latch arm;
c) a plurality of roller bearings positioned on the latch arm;
d) a stop collar on each end of said plurality of roller bearings;
e) a pivot hinge connecting a said first termination end of said latch arm and said first termination end of said contoured configuration; and
f) a latch assembly disposed along a length of said frame, said latch assembly being selectively positionable between a closed configuration and an at least partially open configuration, said second termination end of said latch arm and said second termination end of said contoured configuration having complementary latch mechanisms, said latch assembly allowing for open pivotably of said latch arm when said upper section is squeezed.

22. The cable rolling guide as recited in claim 21 wherein said pivotal latch arm of said latch assembly comprises a substantially linear configuration along said frame.

23. The cable rolling guide as recited in claim 21 wherein said pivotal latch arm of said latch assembly comprises a substantially curved configuration along said frame.

24. The cable rolling guide as recited in claim 23 wherein said frame is at least partially flexible inward toward said opening for at least partially disengaging said pivotal latch arm from said frame.

25. The cable rolling guide as recited in claim 24 wherein said pivotal latch arm is disposable into said outward position upon at least partially disengaging said pivotal latch arm from said frame.

26. The cable rolling guide of claim 21, wherein said latch assembly comprises a reversible locking pin.

27. A cable rolling cade comprising a frame structured to define an inner opening for disposition of a plurality of elongated members there through, said frame comprising:
a) a contoured upper section comprising a contoured configuration, said contoured configuration being flexible and comprising a contoured handle section forming an extended inverted U shaped structure for one-handed gripping thereof;
said contoured configuration further comprising:
  i) a termination end of said contoured configuration;
  ii) a pivot binge positioned at said termination end of said contoured configuration;
b) a circular like lower section, said integral with the frame of the upper section, said circular type lower section further comprising a termination end;
c) a plurality of roller bearings positioned on said circular like lower section;
d) a stop collar on each end of said plurality of roller bearings;
e) a outwardly opening gate, said gate comprising:
  i) a first end; wherein said first end of said gate is pivotably attached to said termination end of said contoured configuration by means of said pivot hinge, and
  ii) a second end;
f) a latch assembly disposed along a length of said frame, said latch assembly being selectively positionable between a closed configuration and an at least partially open configuration, said second end of said gate and said termination end of said circular like lower section having complementary latch mechanisms, said latch assembly allowing for outwardly opening of said gate.

28. The gable rolling guide of claim 27, wherein said latch assembly comprises a reversible locking pin.

29. A cable rolling guide comprising a spiral frame structured to define an inner opening for disposition of a plurality of elongated members there through, said spiral frame comprising:
  a) a first circular type opening formed by the spiral frame, said first circular type opening ending in a first terminus;
  b) a second circular type opening formed by the spiral frame, said second circular type opening larger than said first circular type opening, said second circular type opening integral with said first circular type opening and ending in a second terminus;
  c) a plurality of roller bearings positioned on the frame said second circular type opening; and
  d) a stop collar on each end of said plurality of roller bearings.

30. The cable rolling guide of claim 29, wherein said first circular type opening is off center from said second circular type opening.

31. The cable rolling guide of claim 30, wherein said second circular type opening is positioned below said first circular type opening.

* * * * *